United States Patent [19]
Trepte et al.

[11] Patent Number: 5,562,948
[45] Date of Patent: Oct. 8, 1996

[54] METHOD AND APPARATUS FOR PRODUCING AN ELECTRICALLY CONDUCTIVE WALL FROM A FABRIC AND A SHEET MATERIAL

[75] Inventors: Peter Trepte, Emsdetten; Guenter Luettgens, Odenthal, both of Germany

[73] Assignee: EMPAC Verpackungs GmbH & Co., Emsdetten, Germany

[21] Appl. No.: 343,578

[22] PCT Filed: Feb. 4, 1994

[86] PCT No.: PCT/EP94/00316

§ 371 Date: Nov. 28, 1994

§ 102(e) Date: Nov. 28, 1994

[87] PCT Pub. No.: WO94/22597

PCT Pub. Date: Oct. 13, 1994

[30] Foreign Application Priority Data

Mar. 26, 1993 [DE] Germany .................. 43 09 832.0

[51] Int. Cl.$^6$ .............. B05D 3/14; H05B 7/18; B32B 3/26
[52] U.S. Cl. .......... 427/289; 427/331; 427/444; 219/384; 428/315.9
[58] Field of Search ............... 427/289, 331, 427/444; 118/44, 638; 219/384; 428/304.4, 315.5, 318.6, 307.3, 308.8, 315.9

[56] References Cited

U.S. PATENT DOCUMENTS 3,665,157  5/1972  Harada ...................... 219/384
4,029,938  6/1977  Martin ....................... 219/384

Primary Examiner—Michael Lusignan
Assistant Examiner—Fred J. Parker
Attorney, Agent, or Firm—Jordan and Hamburg; Frank J. Jordan

[57] ABSTRACT

A method for the production of an electrically conductive wall of a fabric and a film material which is provided with an insulating coating, and particularly for the production of sheets of fabric which are provided with an insulating coating and have electrically conductive tapes. In particular, in order to have provided a method with which an electrically conductive wall material with an electrically insulating coating can be prepared, for which the danger of the occurrence of brush discharges is effectively reduced, the coating is perforated after the wall material is coated.

25 Claims, 3 Drawing Sheets

METHOD AND APPARATUS FOR PRODUCING AN ELECTRICALLY CONDUCTIVE WALL FROM A FABRIC AND A SHEET MATERIAL

BACKGROUND OF THE INVENTION

The invention relates to a method for the production of an electrically conductive wall of a fabric and a film material, which is provided with an insulating coating, and particularly for the production of sheets of fabrics, which are provided with an insulating coating and have electrically conductive tapes, these materials being used particularly for the production of flexible containers for bulk goods.

Flexible bulk goods containers are used for packing, transporting, enveloping and storing of different bulk goods material in amounts, in each case of 500 to 2,000 kg. They are also used in areas where there are increased dangers of explosion due to an explosive atmosphere of gases, vapors or mist and due to the combustibility of the bulk goods themselves. An explosion could be initiated by electrostatic charges on the walls of the bulk goods container, such as those charges, which arise when electrically insulating bulk materials are filled into or emptied from an electrically insulated container. Bulk goods containers, which can discharge electrostatic charges, must therefore be used in all areas, in which the danger of an explosion exists due to gases, vapors or dusts.

In designing bulk goods containers, which are cable of discharging electrostatic charges, basically two types of electrostatic charging and discharging phenomena must be taken into consideration.

To begin with, brush discharges, which emanate from charged surfaces of insulating materials and are responsible for the risks in the case of gases and vapors with a low minimum ignition energy, must be taken into consideration. On the other hand, sliding brush discharges, which occur at charge double layers, are important, because appreciable energies are converted by such discharges and thus also have the potential for igniting dusts. Brush discharges can be prevented if the charged surfaces are not larger than $10^4$ mm$^2$. Sliding brush discharges then no longer take place when the breakdown voltage of the double layer is less than 4 kV.

Usually, flexible bulk goods containers are produced from flexible polypropylene tapes. By weaving electrostatically conductive tapes in the warp and filling (weft) directions, the basic container fabric is divided into electrostatically separated area elements, which are not larger than $10^4$ mm$^2$, so that the brush discharges, which emanate from the charged surfaces of insulating materials, do not arise.

Since flexible bulk goods containers of fabric tapes basically are not dust tight, they are provided on their inside with a coating, preferably of polypropylene. In order to prevent sliding brush discharges, which can arise due to the high charge potential at the coating, the breakdown voltage must not exceed 4 kV. This is achieved, by a layer, the thickness of which does not exceed 30 µm. The fabric below can be disregarded for the breakdown resistance, since the fabric of polypropylene tapes, as a result of its porosity, does not have a breakdown resistance higher than that of air.

However, due to the coating, contact with the electrically conductive tapes is prevented, so that the danger of the occurrence of brush discharges, capable of igniting gases and vapors, remains.

SUMMARY OF THE INVENTION

It is therefore an object of the present invention to provide a method of the initially named type, with which an electrically conductive wall material can be produced and, nevertheless, the danger of the occurrence of brush discharges is effectively reduced.

The inventive method makes provisions for perforating an electrically insulating layer, which is on a conductive base. By these means, the insulation of the conductive base is interrupted pointwise. As a result, the coating is affected only insignificantly with respect to the tightness. Nevertheless, the danger of the occurrence of brush discharges is reduced.

Preferably, the perforation is produced by electric puncture, by means of which a perforation can be produced without damaging the conductive substrate. If the substrate, in particular, is a mixed substrate, such as one of sheets of a woven fabric, which consists of an electrically insulating basic fabric, into which the electrically conductive tapes have been woven, a pulsed laser, used alternatively, for example, for producing the perforation, could not differentiate between a coating on an electrically conductive substrate and a coating on an electrically conductive substrate. On the other hand, by electrical perforation, it is automatically possible to select the arched regions, ;namely those, into which the electrically conducting tapes are woven. Moreover, the investment costs for a technology, which is based on electrical perforation, are significantly less than those based, for example, on laser technology.

In the case of a preferred apparatus for carrying out the method, the coated base material is passed over an electrically insulating roller, which functions as a support and opposite which there is the high voltage electrode. The base material preferably runs simultaneously over a second roller, which is electrically conducting and connected with the opposite pole of the high voltage source, which is at ground potential. By these means, contacting of the conductive base or the incorporated, cross-linked tapes is assured, So that this base is at a defined potential and forms the counter-electrode to the high voltage electrode. A second, separately formed electrode is thus not required. The electrical perforation takes place between the electrode and the conductive base or the incorporated tapes. The perforation current is discharged over the, electrically conductive, grounded substrate.

Moreover, the electrically insulating roller ensures that, in the case of sheets of woven fabric with electrically conductive, net-like connected tapes, perforations are made only in the layers on a conductive base, since a spark gap cannot develop between the electrode and the electrically insulated regions of the woven fabric.

The construction of the supporting base as a roll or roller rather than as a plane offers the possibility of fixing more precisely the location having the least distance from the electrode; the electrical perforation then takes place between this location and the high voltage electrode. The electrode advisably is constructed as a point, so that precise positioning of the perforation is possible.

The construction of the supporting base as a roll or roller moreover enables the material to be transported along the electrode. The perforation density can be varied by adjusting the transporting speed and the frequency of the high alternating voltage applied or, in the case of a direct voltage, by selecting the series resistance.

The distance between the electrode and the coating material preferably is adjustable, so that it can be optimized for the respective base material/coating material. The pore size can be controlled by using a series resistance in alternating current operation.

The invention is explained further in the following description and in the accompanying drawings.

DESCRIPTION OF THE PREFERRED EMBODIMENTS

Figure 1:
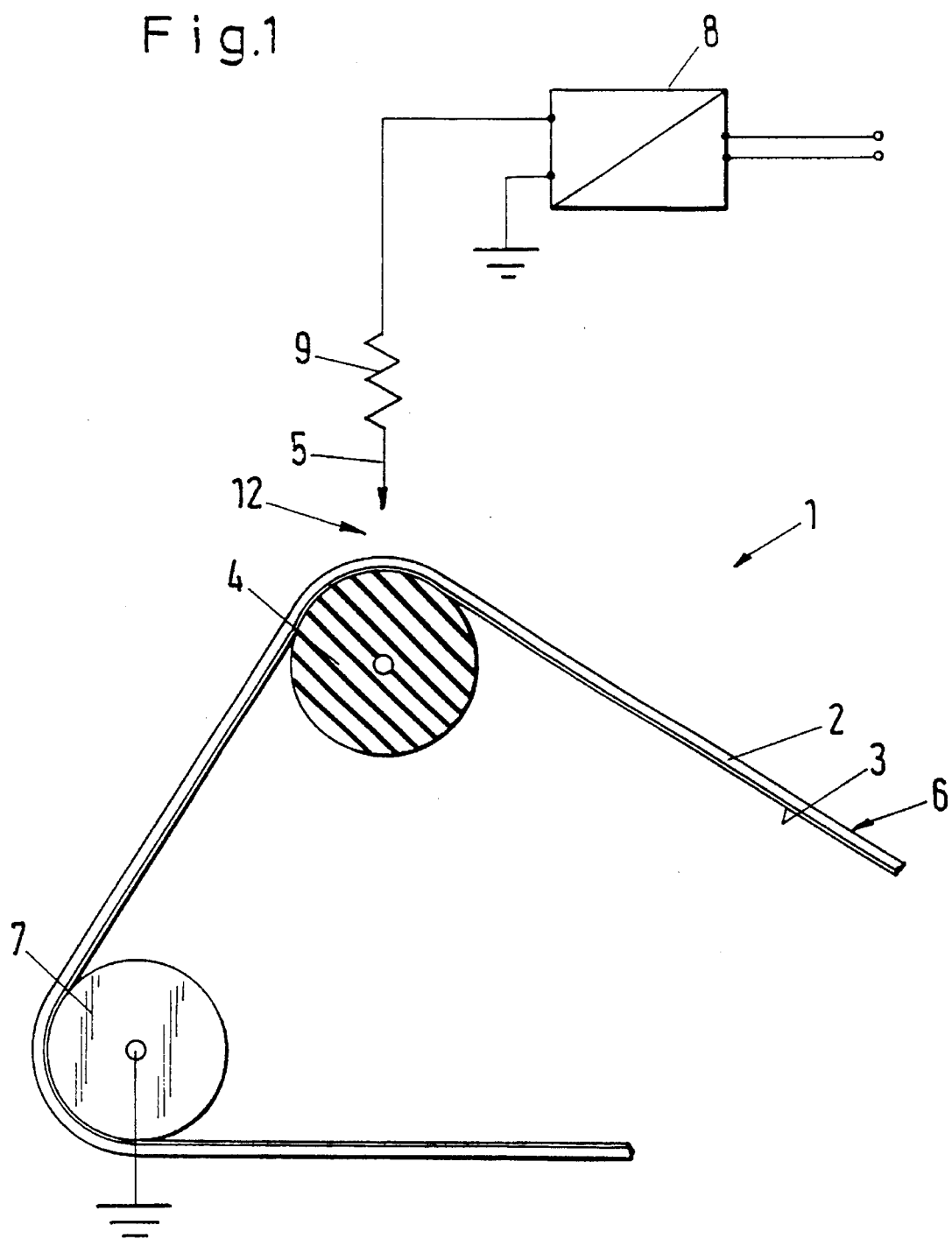
FIG. 1 shows a diagrammatic representation of an apparatus for carrying out the method.

In the apparatus for carrying out the method, which is labeled 1 as a whole in the drawing, an electrically conducting base 3, coated with an electrically insulating layer 2, is passed over an electrically insulating roller 4, which is positioned opposite an electrode 5, which is acted upon with a high voltage. The base 3 either is made entirely from a conductive material or consists of an insulating fabric, into which conductive tapes, connected in net-like fashion, have been woven. The coated material 6 lies on the roller 4 in such a fashion, that the coating 2 faces the electrode 5 and the conductive base 3 runs directly over the roller 4. The distance between electrode 5 and layer 2 is variable within the range of about 5 mm to 20 mm. Moreover, the material 6, with the conductive base 3, runs over a second roller 7, which is electrically conducting and connected with the opposite pole of the high voltage source 8, which is at ground potential. The roller 7 engages the electrically conductive base 3 or the net-like connected, conductive tapes in such a manner, that there is contact and the conductive base lies over the output of the voltage source 8 at a defined ground potential. The material 6 itself is unrolled from a supply and moved with a speed of 0.5 m/s to 5 m/s over the rollers 4 and 7. At the electrode 5, a high voltage, produced by the high voltage source 8, is applied, which can be adjusted selectively between 8 and 15 kV. Between the electrode 5 at high voltage and the electrically conductive base 3 at ground potential, which thus acts as counter electrode, a spark gap is formed, which will perforate when a perforation voltage $U_d$ is reached. This voltage depends on the distance between the electrode 5 and the conductive base 3, on the coating material used and on the thickness of the layer. Since the electrically conductive base 3 runs on an electrically insulating roller 4, there is electric perforation in each case only between the electrode 5 and the conductive base 3 or a tape. If insulated sheets of fabric pass by the electrode 5, electric perforation cannot take place, since a spark gap is not formed; that is, pores are formed only in the region of the coating that lies on an electrically conductive base 3.

In order to produce selective ;perforation pores, it is necessary to control the times at which the high voltage is applied. For this purpose, a series resistance 9 in the range of about 500kΩ to 10MΩ is connected between the high voltage source 8 and the electrode 5.

Figure 2:
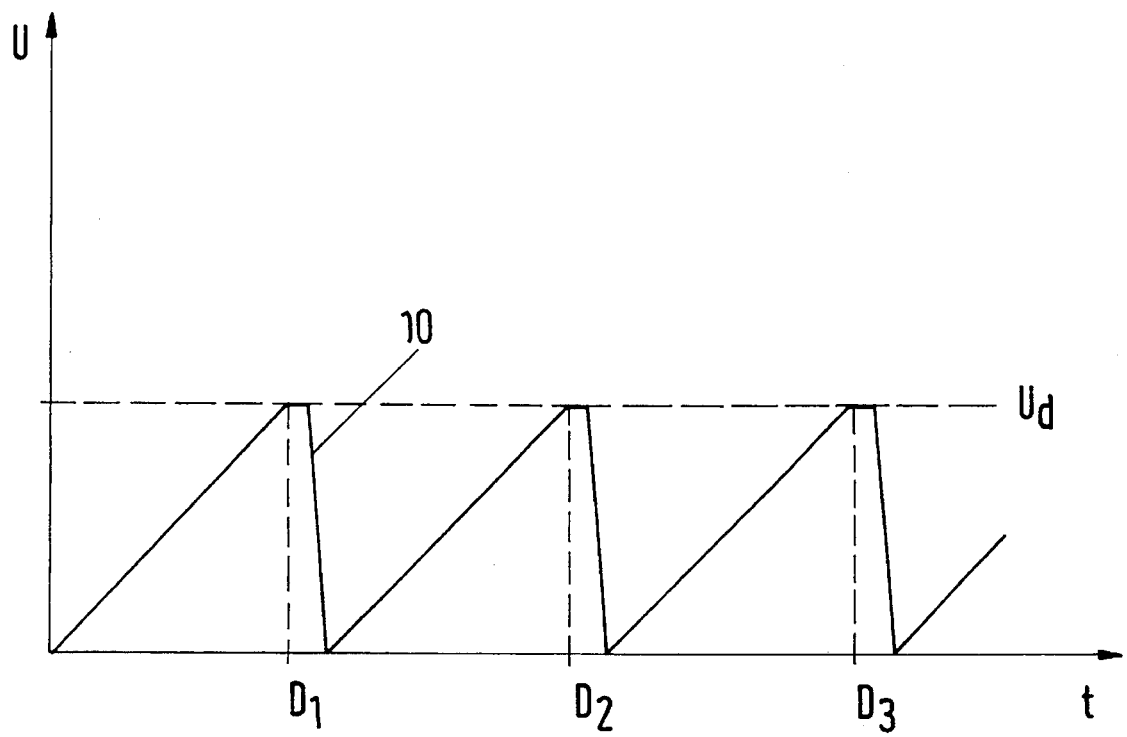
FIG. 2 shows the voltage at the electrode as a function of time, when a direct current voltage source is used.

FIG. 2 shows the voltage 10 at the electrode 5 as a function of time for the case, in which a direct current voltage source is used. The time t, required for the voltage to rise to the value $U_d$, is determined by the capacitance C of the capacitor formed from the electrode point 5 and the conductive base 3 or the conductive tapes respectively, and the series resistance 9 according to the time function $\tau = R \times C$. The capacitor is charged over the series resistance 9 during the time t. When it reaches the perforation voltage $U_d$, there is spontaneous perforation with simultaneous discharge of the capacitor. With that, the perforation process is ended and a pore is produced. The capacitor is charged once again until it reaches the perforation voltage. At the given perforation voltage $U_d$ and at the fixed capacitance C, the perforation frequency is determined by the series resistance 9.

Figure 3:
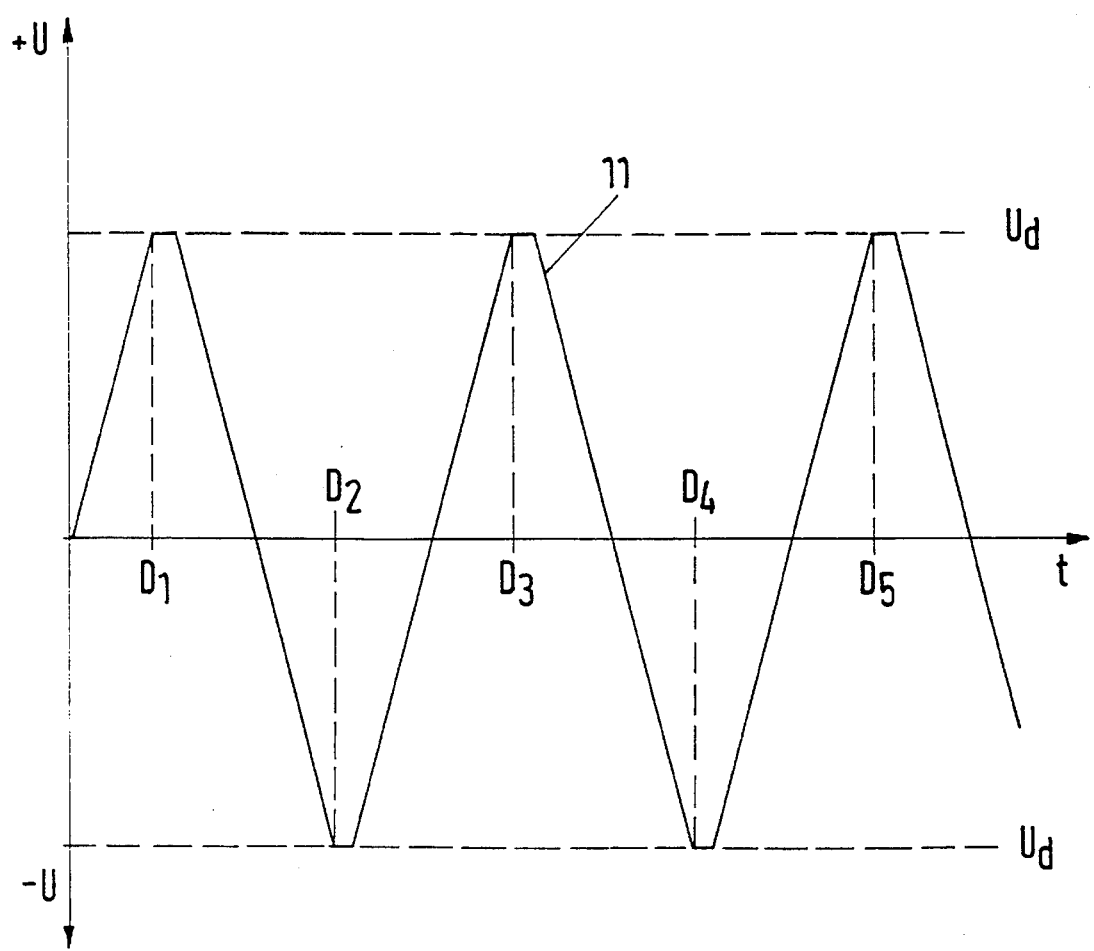
FIG. 3 shows the voltage at the electrode as a function of time, when an alternating current voltage source is used.

FIG. 3 shows the voltage 11 at the electrode 5 as a function of time for the case, in which an alternating current voltage is applied. The perforation frequency is determined here only by the frequency of the alternating current voltage. The voltage, drawn from the high voltage source 8, is selected so that, shortly before passing through a peak or valley, the perforation voltage $U_d$ is reached and there is perforation. The function of the series resistance 9 here is to control the electrical energy supplied and, with that, to control the pore size. A small series resistance produces large pores. As the resistance increases, the pore size decreases.

In the event that a conductive tape is not exactly underneath the electrode point 5 as the woven fabric 6 passes through the apparatus, the air gap 12 for the perforation spark becomes larger, that is, the perforation voltage $U_d$ required becomes larger. If the voltage selected at the high voltage source is so high that it leads to perforation even of the tape furthest removed from the electrode point, a larger spark energy would be introduced if the distance between the electrode point and the tape is smaller, so that a larger pore would be produced. It is therefore advisable to position several electrode points 5 in a common arrangement next to one another in such a manner that they can correspond to the lateral tape fluctuations.

We claim:

1. A method of producing a layered product comprising the steps of:

forming a layered sheet with one layer of an electrically conductive material and an opposing layer of an electrically insulating material;

providing an electrode device in an adjacent spaced relationship with an insulating member to provide a space between said electrode device and said insulating member;

disposing said layered sheet in said space between said electrode device and said insulating member with said layer of electrically conductive material being disposed on said insulating member; and perforating said layer of electrically insulating material which is disposed in said space between said electrode device and said insulating member by applying a voltage from said electrode device sufficient to perforate only said layer of electrically insulating material and thereby producing a layered product having a layer of perforated electrically insulating material and an opposing layer of electrically conductive material.

2. A method according to claim 1 wherein said step of perforating said layer of electrically insulating material comprises perforating a section of said layer of electrically insulating material, said layer of electrically conducting material having a section disposed in superimposed relationship with said section or electrically insulating material, and maintaining contact between said insulating member and said superimposed section of said layer of electrically conducting material during s aid perforating step.

3. A method according to claim 1 further comprising grounding said layer of electrically conductive material during said perforating step, said of grounding said layer of electrically conductive material comprising contacting said layer of electrically conductive material with an electrically conductive member which is at ground potential.

4. A method according to claim 3 further comprising disposing said conductive member at a location laterally displaced from insulating member.

5. A method according to claim 1 further comprising moving said layered sheet between said electrode device and said insulating member, said step of perforating said layer of electrically insulating material comprising applying a voltage from said electrode device to produce plural perforations in said layer of electrically insulating material during said step of moving said layered sheet between said electrode device and said insulating member.

6. A method according to claim 5 further comprising grounding said layer of electrically conducting material with a conducting member disposed downstream of said insulating member.

7. A method according to claim 6 wherein said insulating member is an insulating roller and said conductive member is a conductive roller, said moving step comprising moving said layered sheet over said insulating roller and over said conductive roller with said layer of electrically conductive material contacting said insulating roller and said conductive roller.

8. A method according to claim 5 further comprising moving said layered sheet past said electrode device at a speed in a range of approximately 0.5 meters per second to 5 meters per second.

9. A method according to claim 1 wherein said layer of electrically conductive material comprises electrically conductive tape.

10. A method according to claim 1 wherein said layer of electrically conductive material comprises an electrically conductive tape and an electrically insulating fabric with said electrically conductive tape being Woven into said electrically insulating fabric.

11. A method according to claim 1 wherein said layered product is a flexible container for bulk goods.

12. A method according to claim 1 wherein said layered product discharges electrostatic charges.

13. Apparatus for producing a layered product comprising:

means supplying a layered sheet having one layer of electrically conducting material and another layer of electrically insulating material;

an electrode means disposed in an adjacent relationship with a perforatable part of the layer of electrically insulating material to be perforated;

said layer of electrically conducting material being disposed in superimposed relationship with said perforatable part of said layer of electrically insulating material; and an insulating member adjacent to said layer of electrically conducting material, said insulating member being in contact with said superimposed part of said layer of electrically conducting material;

said electrode means being operable to perforate said perforatable part of said layer of electrically insulating material while perforation of said superimposed part of said layer of electrically conducting material is precluded.

14. Apparatus according to claim 13 further comprising grounding means for grounding said layer of electrically conducting material as said electrode perforates said perforatable part of said layer of electrically insulating material, said grounding means being displaced from a superimposed relationship with said electrode means.

15. Apparatus according to claim 13 wherein said layered sheet is an elongated layer sheet, said means for supplying said layered sheet being operable to supply said elongated layered sheet from a roll to said electrode means.

16. Apparatus according to claim 15, wherein said insulating member comprises an insulating roller and said conducting member comprises a conducting roller, said conducting roller being located downstream of said insulating roller.

17. Apparatus according to claim 13 wherein said electrode means comprises an electrode element, a resistance, and a source of voltage, said resistance being connected in series between said source of voltage and said electrode element, said resistance being variable within a range of approximately 500,000 ohms to 10,000,000 ohms.

18. Apparatus according to claim 17 wherein said source of voltage is an alternating current voltage.

19. Apparatus according to claim 17 wherein said source of voltage is a direct current voltage.

20. Apparatus according to claim 17 wherein said source of voltage is within a range of approximately 8,000 volts to 15,000 volts.

21. Apparatus according to claim 13 wherein the distance between said electrode means and said perforatable part of the layer of insulating material is variable within a range of approximately 5 mm to 20 mm.

22. Apparatus for producing a layered product comprising:

moving means for moving a layered sheet along a path of travel, said layered sheet having one layer of an electrically conductive material and another layer of an electrically insulating material;

an electrode means positioned in said path of travel of said layered sheet;

an electrically insulating member over which said layered sheet is passed with said electrically conductive layer being in contact with said electrically insulating member;

said electrode means overlying said electrically insulating member such that said layered sheet passes between said electrically insulating member and said overlying electrode means; and an electrically conductive member which is at ground potential and over which said layered sheet is passed during said perforating with said layer of electrically conductive material being in contact with said electrically conductive member, said electrically conductive member being laterally displaced from said electrically insulating member along said path of travel of said layered sheet.

23. Apparatus according to claim 22 wherein said electrically insulating member is an insulating roller and said electrically conductive member is a conductive, roller, said conductive roller being laterally displaced downstream of said insulating roller along said path of travel of said layered sheet.

24. Apparatus according to claim 22 wherein said electrode means comprises an electrode element having a pointed end.

25. Apparatus according to claim 22 wherein said electrode means comprises a plurality of electrode elements disposed adjacent to each other.

* * * * *